April 18, 1967 R. W. SAYLER ETAL 3,314,178
NAVIGATIONAL AID
Original Filed July 1, 1963 4 Sheets-Sheet 2
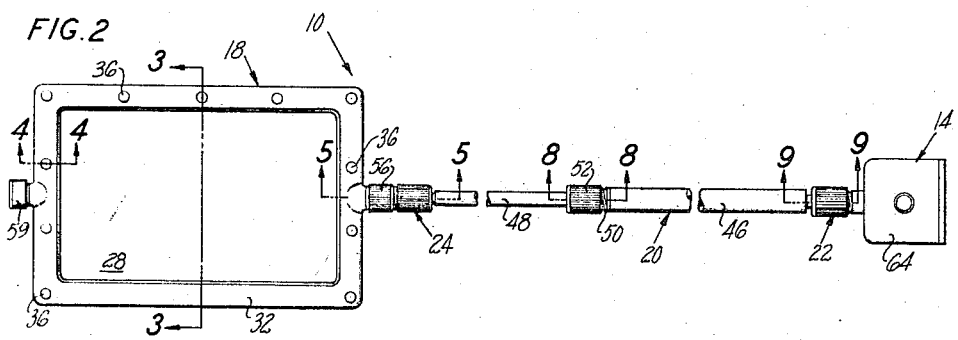
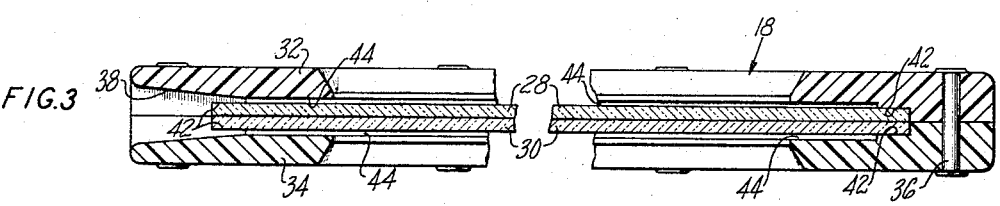
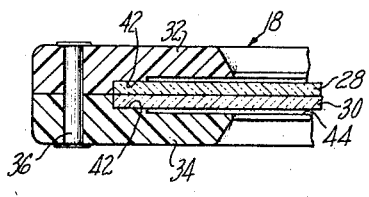
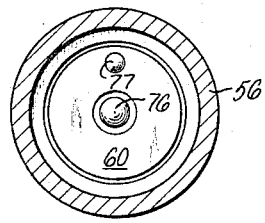
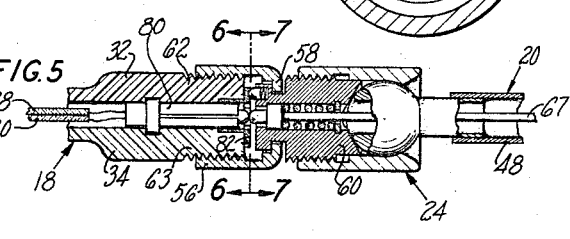
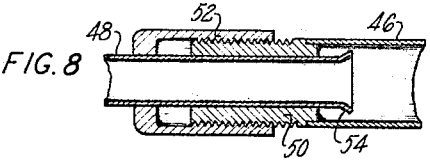
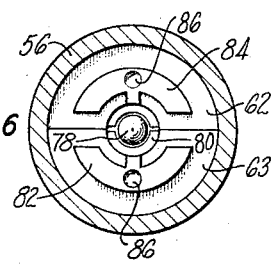
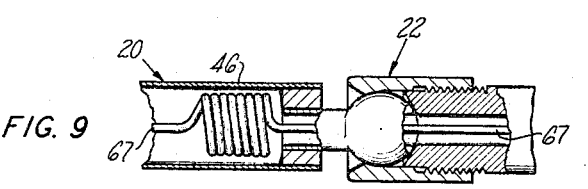
INVENTORS
RICHARDSON W. SAYLER
RALPH E. BAILEY
BY Lindsey, Prutzman and Hayes
ATTORNEYS April 18, 1967 R. W. SAYLER ETAL 3,314,178
NAVIGATIONAL AID Original Filed July 1, 1963 4 Sheets-Sheet 3

INVENTORS
RICHARDSON W. SAYLER
RALPH E. BAILEY
BY Lindsey, Prutzman and Hayes
ATTORNEYS April 18, 1967 R. W. SAYLER ETAL 3,314,178
NAVIGATIONAL AID Original Filed July 1, 1963 4 Sheets-Sheet 4

INVENTORS
RICHARDSON W. SAYLER
RALPH E. BAILEY

BY *Lindsey, Prutzman and Hayes*

ATTORNEYS

United States Patent Office 3,314,178
Patented Apr. 18, 1967

3,314,178
NAVIGATIONAL AID
Richardson W. Sayler, Canton, and Ralph E. Bailey, East Hartford, Conn., assignors to Astro Optics, Incorporated, East Hartland, Conn., a corporation of Connecticut
Continuation of application Ser. No. 291,744, July 1, 1963. This application Sept. 29, 1965, Ser. No. 495,022
1 Claim. (Cl. 40—130)

This is a continuation of application Ser. No. 291,744, filed July 1, 1963, now abandoned.

The present invention relates to the navigation of ships, aircraft and other manned areospace vehicles and is more particularly concerned with a navigational aid having notable usefulness in the piloting of aircraft in instrument weather and nighttime conditions.

With the growth of aircraft traffic, particularly in and around aerodromes, with the increasing approach and landing speeds of aircraft and with the use of increasingly complex flight arrival and departure patterns, the ready availability to the aircraft pilot of discernible navigational information is becoming more and more of an absolute necessity. For example, modern jet aircraft fly at a speed which is well above 200 miles per hour in the aerodrome arrival pattern and while at that speed, in order to process the aircraft for landing, the pilots are often instructed, via voice communications from an air traffic controller, to "hold" at a designated navigational fix or to proceed from one navigational fix to another prior to the approach for landing. The problem of arrival navigation is further complicated in instrument weather conditions precluding visual flight, visual separation of aircraft or a visual landing, inasmuch as a navigational inaccuracy or a slow response to the ground controller's directions may result in a collision with other aircraft or with the ground. In such instrument weather conditions and usually during nighttime flying, a pilot in addition to having to visualize the controller's instructions for navigating the aircraft must maintain a close visual scan of the aircraft flight and navigational instruments and thereby ensure that the aircraft is proceeding safely and in accordance with those instructions. Thus, the pilot must visually scan the appropriate navigational information and the aircraft instruments and relate these almost instantaneously to the controller's instructions as they are received, all while the aircraft is traveling at a high rate of speed. Accordingly, the pilot must have the navigational information readily available to him so that he can carry out this task. This navigational information is conventionally made available to the pilot by means of a notebook having pages devoted to each aerodrome and including a geographic representation of the aerodrome and the local navigational fixes and the electronic aids useful to the pilot. This manner of providing the navigational information is, however, less discernible and useful than that desired, particularly by a pilot who is also engrossed in the numerous other tasks of flying the aircraft. It is, therefore, a principal aim of the present invention to provide a novel and useful navigational aid for presenting navigational information to the pilot in a clear and distinct manner so that it is readily discernible for rapid interpretation.

It is another aim of the present invention to provide a new and novel navigational aid which displays the appropriate navigational information in a manner convenient to the pilot.

Another aim of the present invention is to provide a new and improved navigational aid for presenting legible and easily discernible navigational information during both daylight and nighttime conditions.

A further aim of the present invention is to provide a novel device for displaying navigational information which allows for rapid change of the information.

Still another aim of the present invention is to provide a new and improved navigational aid for the pilot of an aircraft or other vehicle which does not distract the pilot or otherwise interfere with his control of the vehicle.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claim.

In the drawings:

FIG. 2 is an enlarged longitudinal view, partly broken away, of the navigational aid;

FIG. 3 is an enlarged section view, partly broken away, taken substantially along line 3—3 of FIG. 2;

FIG. 4 is an enlarged partial section view taken substantially along line 4—4 of FIG. 2;

FIG. 5 is an enlarged partial section view taken substantially along line 5—5 of FIG. 2;

FIG. 6 is an enlarged section view taken substantially along line 6—6 of FIG. 5;

FIG. 7 is an enlarged section view taken substantially along line 7—7 of FIG. 5;

FIG. 8 is an enlarged partial section view taken along line 8—8 of FIG. 2;

FIG. 9 is an enlarged partial secion view taken substantially along line 9—9 of FIG. 2;

Figure 1:
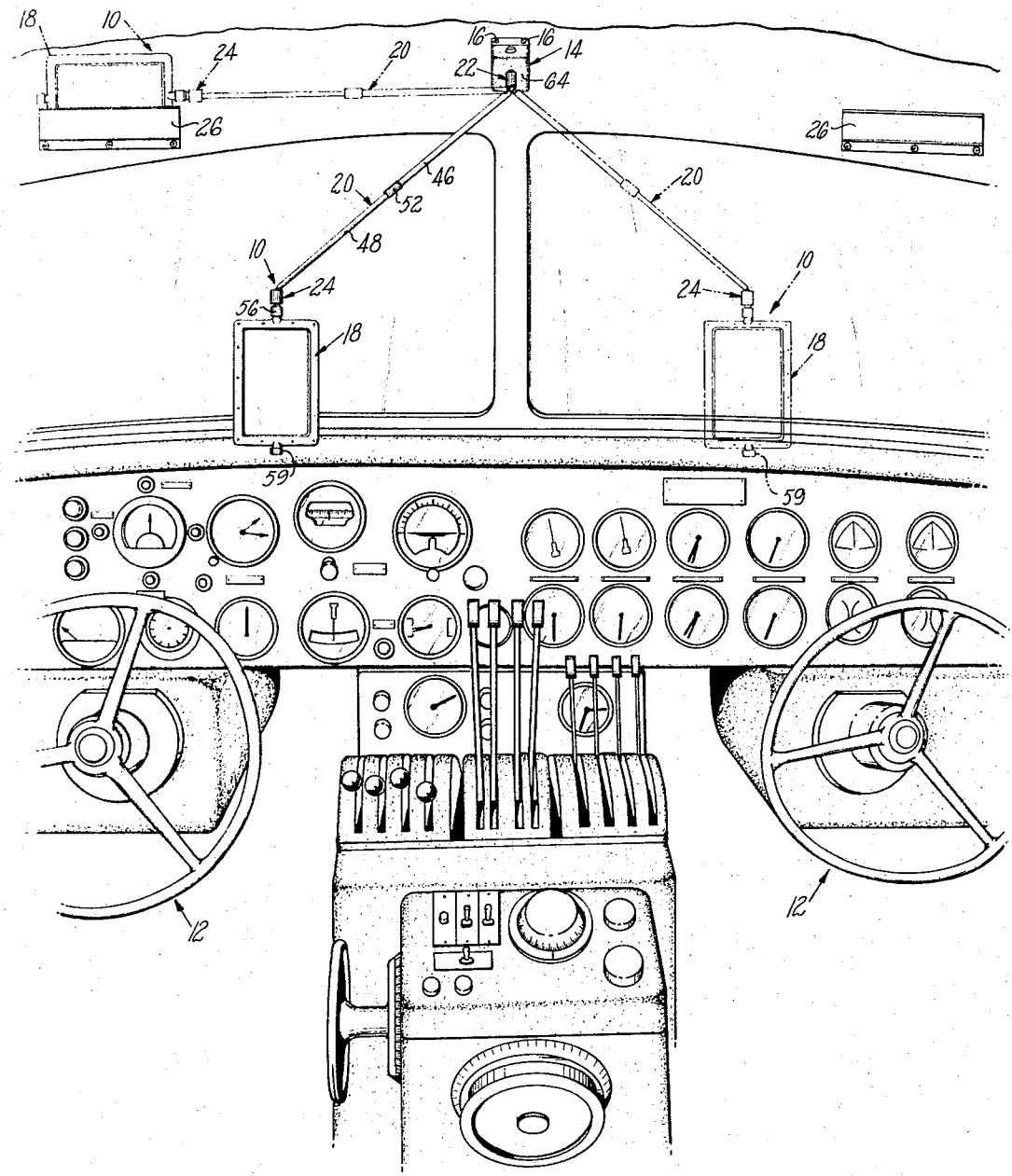
FIG. 1 is a perspective view, partly broken away, of the forward portion of an aircraft cockpit showing an embodiment of the navigational aid of the present invention in full lines in one position and in phantom lines in two other positions.

Referring now to the drawings in detail, FIG. 1 shows an embodiment of a navigational aid 10 of the present invention installed in an aircraft cockpit of the type having dual controls 12. The navigational aid 10 is shown mounted centrally above the front windshield by a support 14 rigidly secured to the aircraft, as by screws 16, and includes a generally rectangular frame 18 which is made adjustable by means of a telescoping arm 20 having a first universal connection 22 with the support 14 and a second universal connection 24 with the frame 18. Consequently, the frame 18 may be readily positioned by the aircraft pilot or copilot for optimum viewing with minimum head movement and without interfering with his scan of the aircraft instruments or control of the aircraft. A pair of brackets 26, which is shown provide a pair of elongated pockets, are mounted above the aircraft windshield for storing the frame 18 when it is not in use, as shown in phantom lines in FIG. 1.

Mounted within the frame 18 are a pair of electroluminescent plates 28, 30 in back-to-back relationship. These plates are of conventional construction and in a well known manner they each include a layer of electroluminescent phosphor which serves as a light emitting source when an electrical potential is applied thereto. The two electroluminescent plates 28, 30 therefore provide a pair of oppositely facing lamps of rectangular planar configuration.

The frame 18, which is preferably black to eliminate glare and constructed of molded plastic, comprises two frame halves 32, 34 which are suitably connected by a plurality of rivets 36 located along three sides of the frame. On the fourth side of the frame there is provided an inwardly tapering opening 38 for feeding slides as of the type 40 shown in FIG. 10. The frame halves 32, 34 have rectangular recesses 42 for receiving the electroluminescent plates, 28, 30 and a second pair of smaller rectangular recesses 44 communicating with the tapered opening 38 which provide guide tracks for retaining the slides inserted in the frame. Therefore, it should be apparent that one or two slides can be readily inserted through the opening 38 and retained therein in superimposed relationship with either one or both of the electroluminescent plates 28, 30.

The telescoping arm 20 includes an outer cylindrical section 46 and an inner cylindrical section 48 which are connected by means of a threaded bushing 50 secured to the outer cylindrical section 46 and to which the inner cylindrical section 48 may be adjustably secured by a serrated knob 52 threaded to the bushing 50. Therefore the length of the telescoping arm 20 can be readily adjusted with the outwardly flared end 54 of the inner cylindrical section 48 providing a stop for establishing the maximum arm length. The universal connection 22, which includes a conventional ball and socket joint, provides for attaching the section 46 of the telescoping arm to the support 14. The universal connection 24 is semilarly constructed for connecting the section 48 of the telescoping arm to the frame 18. This latter connection additionally include a sleeve 56 having an inwardly extending annular flange 58 which is received within a complementary annulus in a bushing 60 to allow for turning the frame relative to the telescoping arm as by a serrated knob 59 formed integrally with the frame halves 32, 34. This sleeve 56 is threaded to a pair of matching projections 62, 63 integrally formed with the frame halves 32, 34, respectively, for attachment to the frame 18.

Figure 11:
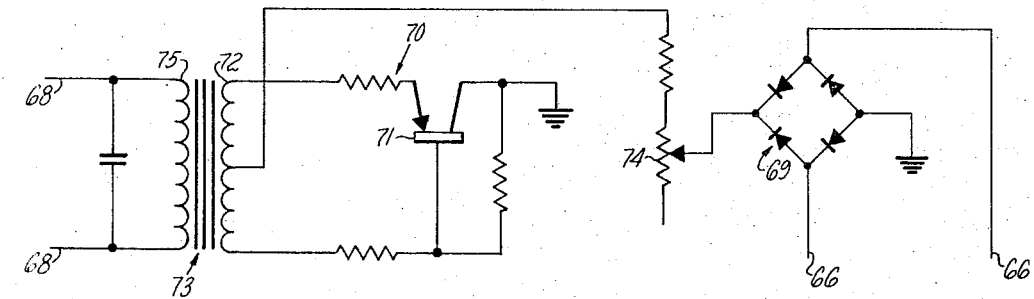
FIG. 11 is a schematic view of an electrical system of the navigational aid.

A schematic of an electrical circuit for supplying power to the electroluminescent plates is shown in FIG. 11. This electrical circuit, which may be usefully installed within a housing 64 of the support 14, has a pair of input leads 66 for connection to an A.C. power source, and a pair of output leads 68 for connection to the electroluminescent plates 28, 30. Generally, the electrical circuit includes a rectifier bridge circuit 69 for supplying pulsating D.C. power to an exciter circuit, generally denoted by the numeral 70. The exciter circuit includes a transistor 71 which is connected for exciting a center tap primary 72 of a transformer 73 for developing a frequency in the transformer secondary 75 which is preferably of the order of 400 cycles per second. This circuit is made controllable for regulating the intensity of the light emitted from the electroluminescent plates by a manually controllable variable resistor 74.

The output leads 68 of the circuit are electrically connected to the electroluminescent plates by means of a two-wire lead 67 threaded through the universal connections 22, 24 and the telescoping arm 20 for electrical connection to a pair of spring-biased contacts 76, 77 slideably mounted in the bushing 60 of the universal connection 24. The contact 76 is centrally located for cooperation with a contact 78 of an electrical connector 80 secured within an axial opening formed by recesses in the frame extensions 62 and 63. A pair of substantially semicircular contacts 82, 84 (FIG. 6) are secured to the frame extensions 62, 63 for electrical connection with the connector 80, and are adapted for alternative engagement by the contact 77, as the frame 18 and sleeve 56 are turned with respect to the bushing 60. Partially spherical recesses 86 are preferably provided in the contacts 82, 84 to provide detents for holding the frame in either of two 180°- apart positions. The electrical connector 80 provides for connecting the center contact 78 with a lead common to both electroluminescent plates and for connecting the semicircular contacts 82, 84 with the electroluminescent plates 28, 30, respectively. Consequently, the electrical connections provide for energizing only one of the electroluminescent plates at any one time and with selectivity being provided by turning the frame. A slide can therefore be placed for superimposition on one or both of the electroluminescent plates and the frame appropriately positioned and the light intensity of the electroluminescent plates controlled for convenient scanning of the navigational information portrayed on the slides. The telescoping arm section 48 is to be arranged so that the slide facing the pilot is illuminated. The oppositely facing electroluminescent plate will remain off thereby avoiding any possible glare which might otherwise result due to the reflection of light from the windshield of the aircraft.

Figure 12:
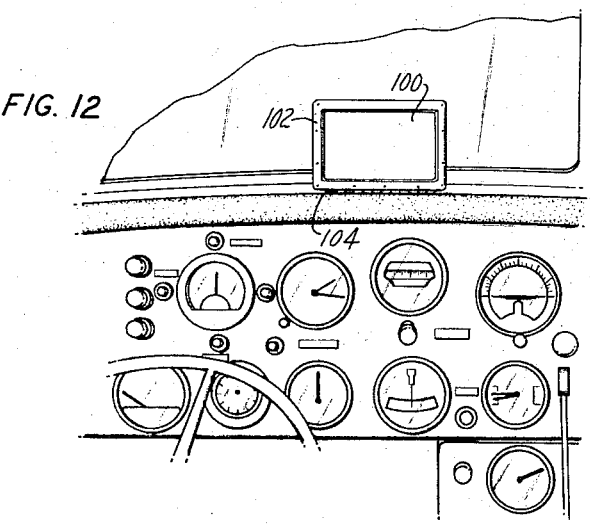
FIG. 12 is a perspective view of an aircraft cockpit installation of another embodiment of the navigational aid of the present invention.
Figure 13:
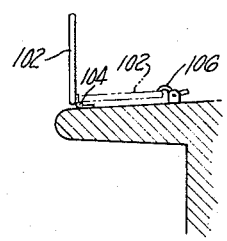
FIG. 13 is a partial transverse section view of the installation of FIG. 12.

Another embodiment of the navigational aid is shown in FIGS. 12 and 13. In this embodiment a single electroluminescent plate 100 is inserted in a generally rectangular frame 102 having an opening for inserting the slide at the upper edge thereof. The lower edge of the frame is pivotally mounted adjacent the aircraft instrument panel on the front console preferably by a hinge 104 which incorporates a torsional spring to bias the frame to its forward pivotal extremity where the frame is substantially upright for convenient viewing by the aircraft pilot with a minimum of additional head movement. The frame 102 when not in use may be conveniently stored, as shown in phantom lines in FIG. 13, by depressing the frame forwardly until it is retained in a generally horizontal position by a suitable catch 106. This embodiment of the navigational aid may subsequently be used by releasing the catch.

Figure 10:
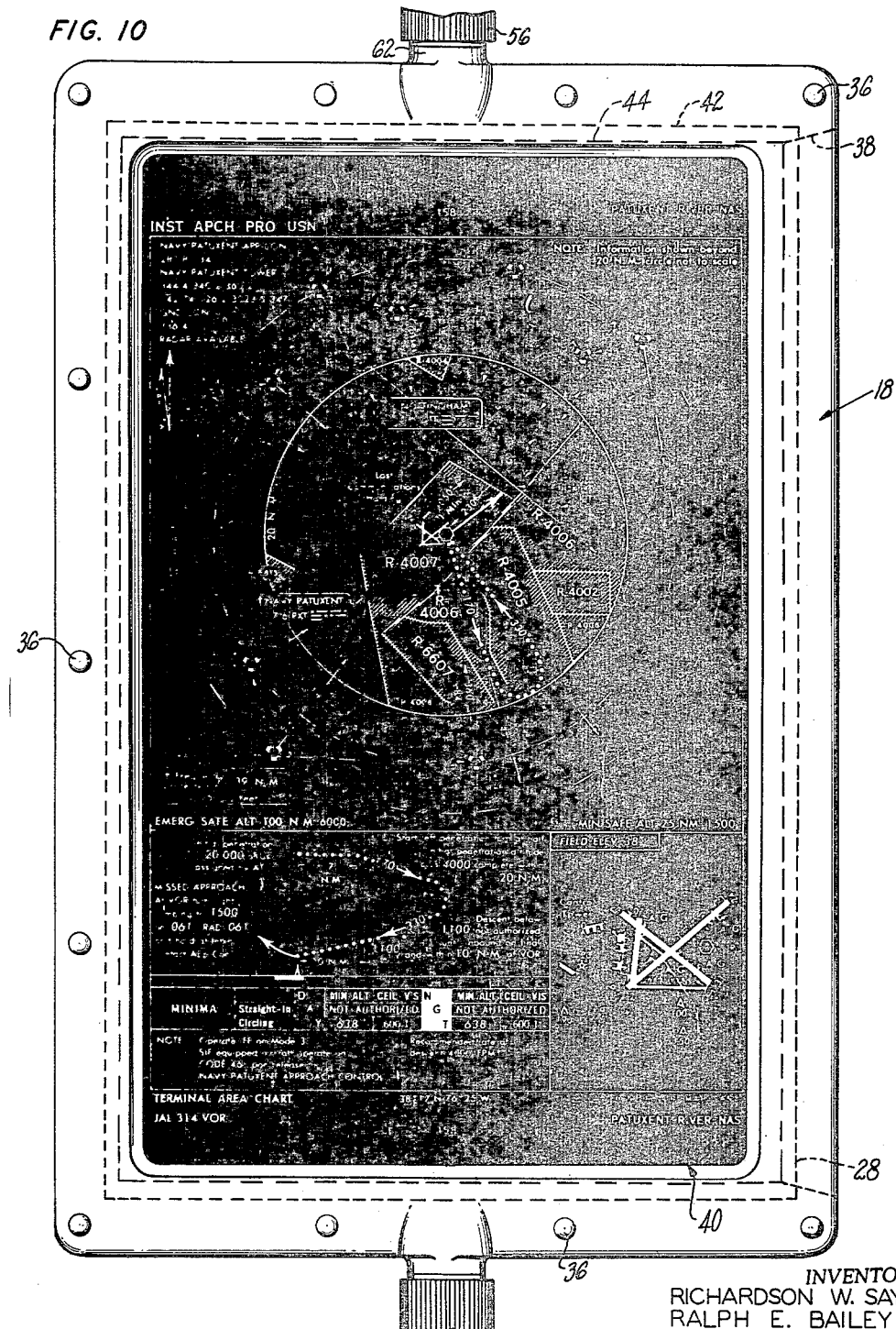
FIG. 10 is an enlarged partial longitudinal view of the navigational aid showing a representation of aeronautical navigational information.

The particular slide 40, shown in FIG. 10, emphasizes the usefulness of the present invention. This slide 40 provides a negative representation of the important navigational information required by a jet pilot when approaching the Patuxent River Naval Aerodrome for landing. The slide 40 by the provision of relatively opaque and translucent (including transparent) areas includes a geographic display of the aerodrome and the navigational facilities in the area of the aerodrome which would be normally used by the air traffic controller in processing the aircraft for landing at the Patuxent River Naval Aerodrome. Also, the slide 40 incorporates much additional information useful by the pilot including the usual communication frequencies, the layout of the aerodrome runways and the criteria for the approach for landing. The slide 40 is preferably constructed of transparent clear plastic with the opaque areas printed or otherwise formed in black thereon; however, it has been found that a transparent plastic tinted with yellow, red or blue is also useful. For reducing cockpit lighting and glare and for increasing the clearness of the representation provided by the slide, the opaque areas of the slide are preferably sufficiently black to exclude the transmission of all light therethrough.

Slides similar to the slide 40 and showing the important information for approaching other aerodromes or for displaying enroute or departure navigational information are contemplated as a part of the present invention and would be, as needed, inserted in the frame for use by the pilot. The pilot can therefore readily navigate the aircraft in accordance with the air traffic controller's instructions or with his predetermined flight plan, all without interfering with his normal instrument scan or control of the aircraft. As a result the navigational aid has its most noteworthy utility in instrument weather and nighttime conditions where visual flying is impossible or, at best, difficult, inasmuch as the pilot is required to use a negligible amount of any additional head movement in the process of including the navigational aid in his visual scan.

Also, during nighttime operation when it is important to keep the cockpit dark for maintaining the pilot's night vision, the navigational aid intensity can be adjusted for rapid discernment of the slide representation without the otherwise necessity of directing an auxiliary light such as a flashlight on a non-illuminated chart. It should therefore be understood that the navigational aid of the present invention provides for the pilot a highly useful device for portraying the great quantity of navigational information which he must use even during a routine flight, all without interfering with his operation and control of the aircraft or interfering with his normal scan of the aircraft instruments.

As will be apparent to persons skilled in the art, various modifications and adaptations of the structure above described will become readily apparent without departure from the spirit and scope of the invention, the scope of which is defined in the appended claim.

We claim:

In a chart holder for aircraft, a telescoping arm swingably connected to a supporting member in said aircraft, a chart receiving generally planar frame pivotally attached to said arm, said frame being open on opposite sides for displaying charts on each side thereof, electroluminescent panel means adapted for providing lighting on the opposite sides of said frame secured centrally within said frame generally coplanar therewith, a recess located between the opposite sides of said panel means and said frame for receiving said charts, an elongated opening along one edge of said frame providing access to said recesses, and control means connecting said electroluminescent panel means to an electrical power source for selectively energizing opposite sides of said panel means and for varying the lighting intensity of the panel means.

References Cited by the Examiner

UNITED STATES PATENTS

| | | | |
|---|---|---|---|
| 922,204 | 5/1909 | Smith | 240—73 |
| 1,701,696 | 2/1929 | Parsons | 40—10 |
| 2,646,637 | 7/1953 | Nierenberg | 40—106.1 X |
| 2,716,298 | 8/1955 | Spielmann | 40—130 |
| 2,824,393 | 2/1958 | Shapiro | 40—10 |
| 2,850,837 | 9/1958 | Karalus | 40—125 X |
| 2,971,125 | 2/1961 | Aiken | 40—130 X |

FOREIGN PATENTS 679,354   1/1930   France.

EUGENE R. CAPOZIO, *Primary Examiner.*

H. F. ROSS, *Assistant Examiner.*